(12) United States Patent
Corkran

(10) Patent No.: US 6,532,312 B1
(45) Date of Patent: Mar. 11, 2003

(54) PHOTOQUILT

(75) Inventor: F. Lee Corkran, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/332,683

(22) Filed: Jun. 14, 1999

(51) Int. Cl.[7] .............................. G06K 9/36; G09G 5/00
(52) U.S. Cl. ...................................... 382/284; 345/683
(58) Field of Search ................................ 382/128, 284, 382/268, 263, 294, 295, 173, 164, 165, 181, 203, 232, 298; 345/592, 620, 629, 634, 835, 839, 733, 683; 348/598, 588, 596

(56) References Cited

U.S. PATENT DOCUMENTS

| | | | |
|---|---|---|---|
| 5,022,085 A | 6/1991 | Cok | 382/1 |
| 5,095,835 A | * 3/1992 | Jernigan et al. | 112/262.3 |
| 5,185,808 A | 2/1993 | Cok | 382/1 |
| 5,187,754 A | 2/1993 | Currin et al. | 382/54 |
| 5,444,835 A | 8/1995 | Turkowski | 395/135 |
| 5,623,590 A | 4/1997 | Becker et al. | 395/326 |
| 5,649,032 A | 7/1997 | Burt et al. | 382/284 |
| 5,790,121 A | 8/1998 | Sklar et al. | 345/356 |
| 5,796,861 A | 8/1998 | Vogt et al. | 382/128 |
| 6,137,498 A | * 10/2000 | Silvers | 345/435 |
| 6,263,816 B1 | * 7/2001 | Codos et al. | 112/475.08 |
| 6,295,370 B1 | * 9/2001 | D'Hooge | 382/162 |

* cited by examiner

Primary Examiner—Bhavesh Mehta
Assistant Examiner—Kanji Patel
(74) Attorney, Agent, or Firm—Peyton C. Watkins

(57) ABSTRACT

A mosaic image, called a quilt, is created from a large (but finite) number of images submitted by people via the internet. Viewers, through the internet may view the quilt, zoom in or out, pan through the mosaic image to view images used to make the quilt and add there own images. Clicking on a particular image accesses text and other data on that particular image. A search engine allows the viewers to locate one or a related group of images. Images can be organized by hue or other attributes to generate an overall larger recognizable image (such as the Kodak logo, or outline of the continents). In the preferred embodiment, a mosaic of the world is the initial mosaic that is viewed via the internet and has the various mosaic tiles that make up the world replaced by a large number of images submitted in a predetermined, sequential manner by people all over the internet.

6 Claims, 5 Drawing Sheets

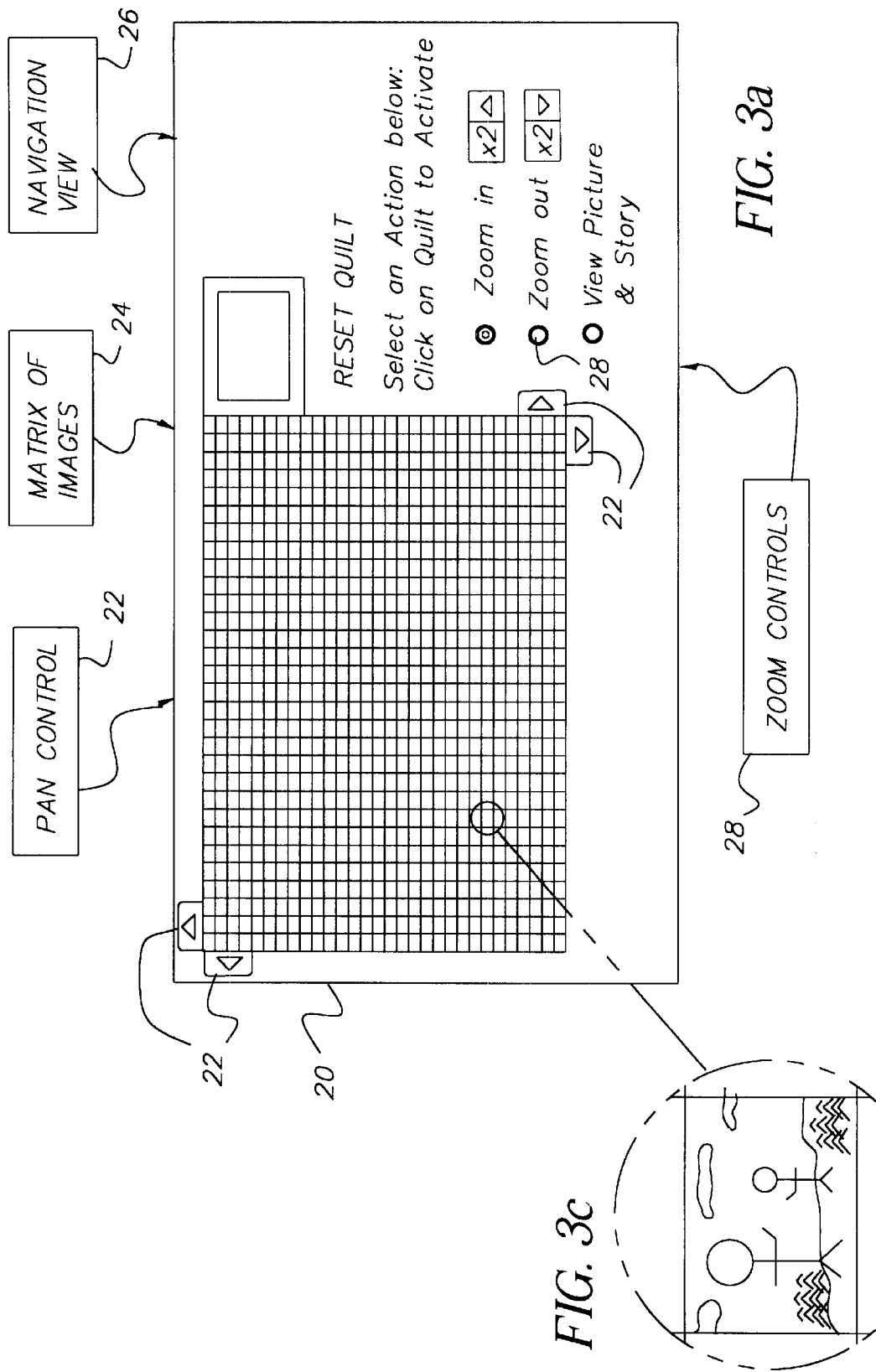

PHOTOQUILT

FIELD OF THE INVENTION

This invention relates in general to digital imaging, and more particularly, to creating digital mosaics employing separate images as the individual tiles.

BACKGROUND OF THE INVENTION

Prior art data base management systems have allowed a user, desiring to locate a particular photograph amongest a group of photographs, accesses a photographic search engine via a network (LAN, telephone, internet, etc.). The search engine provides access to a database of records containing photographic images with related text and other identifying information. The search engine locates photographic images of interest using the text and identifying information, and displays selected images singly or in a matrix. The display may optionally show some of the related text or identifying information. The user may optionally choose one of the images to view an enlargment or to view the related text or identifying information. Subsequent actions may then be taken (e.g. purchase of image, modification of image, etc.) Such a system is illustrated in FIG. 1.

As shown in FIG. 2, a user chooses to view a group of images, where the arrangement of the group of images may be random or may have some organization. The images may have text or identifying information associated with them. The user accesses a matrix of images via a network (LAN, telephone, internet, etc.). The user may choose to view the matrix, add or edit images, or search for images that are related to each other. To view the matrix, the user is presented with a matrix of images. The user is provided controls to adjust the view of the matrix, such as pan controls (move right, move left, move up, move down, etc.) and zoom controls are provided (zoom in, zoom out). In addition, a navigation view is provided that shows the portion of the matrix that is currently being viewed by the user.

Numerous prior art disclosures exist that illustrate methods for forming mosaics and composites from images. A number of these prior art teachings are discussed below.

U.S. Pat. No. 5,790,121 teaches a user interface for displaying database records as clusters wherein icons representing clusters, or records, are selected for zoom in features. This prior art device requires a display map to operate and provides no insight towards the building of a larger image from discrete images.

U.S. Pat. No. 5,185,808 is a Method for Merging Images that deals with the reduction in edge artifacts when image data from one image is merged with data from another. This prior art disclosure device only merges images and provides no usefulness towards the building of a larger image from discrete images.

U.S. Pat. No. 5,022,085 is a Neighborhood-based Merging of Image Data that again deals with the blending of merged pixels and again provides no usefulness towards the building of a larger image from discrete images.

U.S. Pat. No. 5,796,085 is a Mosaic Construction disclosure that provides a system that can create composite image using electron micrographs. While teaching the creating of larger composites this prior art disclosure provides a system that can create images from only a single source and provides no usefulness towards the building of a larger image from numerous sources.

U.S. Pat. No. 5,022,085 is a Neighborhood-based Merging of Image Data that again deals with the blending of merged pixels and again provides no usefulness towards the building of a larger image from discrete images.

U.S. Pat. No. 5,187,754 is a disclosure that deals with the Forming of a Composite Image From a Mosaic of Images. While useful in creating a larger composite image form numerous detailed photos, a high level view of the overall image is required to guide the placement of the higher resolution images and provides no usefulness towards the building of a larger image from discrete images without an overall view of the image to be created.

U.S. Pat. No. 5,649,032 is a patent disclosure that creates a mosaic from a plurality of input images. While useful in creating a larger composite image from numerous images, the main thrust of this prior art disclosure is to align images from a common source and provides no usefulness towards the building of a larger image from discrete images that are obtained from numerous sources.

U.S. Pat. No. 5,623,590 is a patent that teaches displaying a time varying data on a map. While useful in creating a larger composite image from numerous images and providing zoom capabilities about a node, the main thrust of this prior art disclosure is related to time varying inputs and does not teach the building of a larger image from discrete images that are obtained from sources that are not time varying.

From the foregoing discussion it should be readily apparent that there remains a need in the art towards the building of a larger image from discrete images that are obtained from numerous sources.

SUMMARY OF THE INVENTION

It is an object of the present invention addresses the shortcomings within the prior art by providing a method and system that is useful in creating a larger image from images that are obtained from numerous sources.

It is further an object of the present invention to provide a larger image created from smaller images that has zoom capabilities that can be either text based searching or searching through the larger image by viewing the smaller images in various zoom levels.

It is further an object of the present invention to provide a larger image created from smaller images that has the ability to place the smaller images within the larger image in accordance with a predetermined criteria.

The larger image referred to herein as the "quilt" starts with a large picture, which within the preferred embodiment is a picture of the earth from space. The "quilt" is actually composed of tiles and the quilt starts with a finite number of default images. These tiles are replaced with the user-submitted pictures, placed that can be placed randomly or with any of a number of predetermined placing methods. The goal of the "quilt" is to be composed of the (eventual) sum total of images uploaded, which sum total is configurable and modifiable.

The web site visitor uploads a digital image file, in a fashion like PictureThis or PhotoChat, where it conforms to a certain aspect ratio. Also, there is a form with check boxes and text fields where they can include how the picture was taken and comment why they submitted their picture and what the end of the millenium means to them. If the image is accepted (based on Kodak editorial guidelines), it will be added to a generated Flashpix image of the quilt.

A visitor to the web site will also be able to pan around the quilt image; zoom in on an area; select any particular image title and reveal that tile's input data—i.e., what the person who submitted the image had to say about it. They will also be able to search the quilt, in a similar fashion to a web search engine, for particular images based on key words or themes.

An optional attribute of this project is to build the quilt with imaging algorithms that match hues and values of submitted images and create a recognizable pattern in the overall quilt image. This pattern could be either a larger image or symbol, such as the K-logo shape or the composite similarity of the each image, for example.

As the "quilt" progresses and the upload option eventually concludes, various output options can be employed for displaying the quilt. These output options include displaying the "quilt" as an internet site of its own, or as any of a variety of display options. One of these output options relates to displaying the largest image ever made, such as museums, posters, magazine stories, billboards, public busses, or Kodarama in Times Square.

BRIEF DESCRIPTION OF THE DRAWINGS

FIG. 3a is a diagram of the PhotoQuilt™ matrix of images which is the preferred embodiment of the present invention;

FIG. 3c is an illustration of one of the images used to form the quilt;

FIG. 4 is a block diagram of an enlarged portion of the matrix of images shown in FIG. 3a;

FIG. 5 illustrates a possible search result of the matrix seen in FIG. 3a;

DETAILED DESCRIPTION OF THE INVENTION

It has been discovered that a larger image can be created from a number of smaller images in the form of a quilt. The larger image referred to herein as the "quilt" starts with a large picture, which within the preferred embodiment is a picture of the earth from space. The "quilt" is actually composed of tiles and the quilt starts with a finite number of default images. These tiles are replaced with the user-submitted pictures, placed that can be placed randomly or with any of a number of predetermined placing methods. The goal of the "quilt" is to be composed of the (eventual) sum total of images uploaded, which sum total is configurable and modifiable.

The preferred embodiment of this quilt is the Kodak® PhotoQuilt™ 20 that can be accessed via the internet at the Kodak® world wide web site as shown in FIG. 3a. A user chooses to view a group of images, where the arrangement of the group of images may be random or may have some organization. FIG. 3c is an exploded view illustrating how one of the images within the matrix could appear. The images may have text or identifying information associated with them. The user accesses a matrix of images 24 via a network (LAN, telephone, internet, etc.). The user may choose to view the PhotoQuilt™ 20 matrix, add or edit images, or search for images that are related to each other. To view the matrix, the user is presented with a matrix of images. The user is provided controls to adjust the view of the matrix, such as pan controls 22 (move right, move left, move up, move down, etc.) and zoom controls 28 are provided (zoom in, zoom out). In addition, a navigation view 26 is provided that shows the portion of the matrix that is currently being viewed by the user. The user can pan and zoom around the matrix of images as desired. At any time, the user can directly select an image for individual viewing. In one embodiment, this is accomplished by double-clicking on the desired image. The user can optionally search the matrix of images. A search engine utilizes text data and identifying information associated with each image in the matrix in a common manner. In one embodiment, the results of the search are displayed as separate images, but may alternatively be displayed as a matrix of images. The user can select any image from the search results and the matrix of images immediately surrounding the selected image is displayed. The user can select any image in the matrix to view the associated text or identifying information. The present embodiment shows adjacent images with no spacing or border between the individual images.

Figure 1:
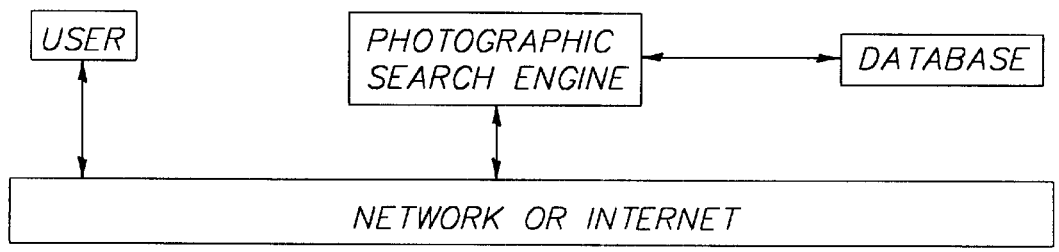
FIG. 1 is a block diagram of a typical prior internet or network based database and search manager.
Figure 5:
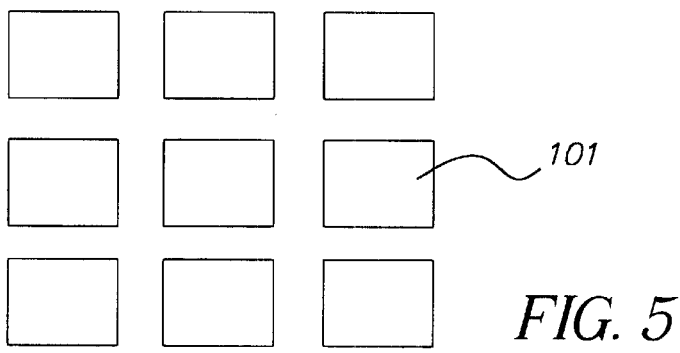
Figure 6:
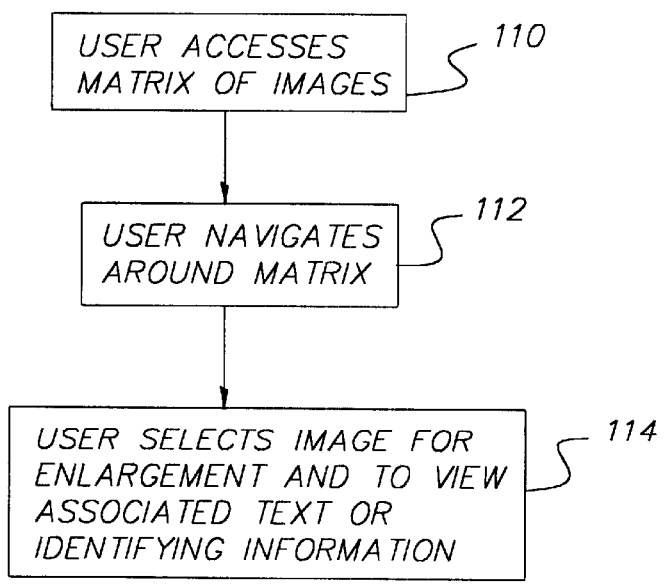
FIG. 6 is a block diagram of the selection process envisioned by the present invention.
Figure 2:
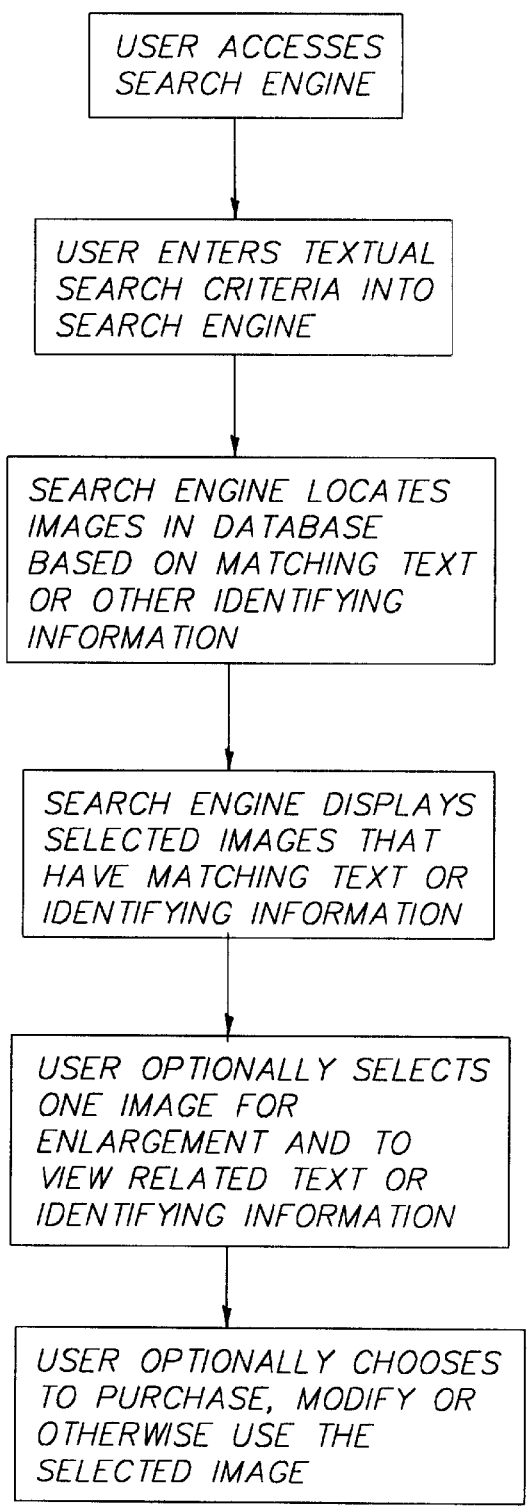
FIG. 2 is a more detailed diagram of the search capabilities of the diagram shown in FIG. 1.
Figure 3B:
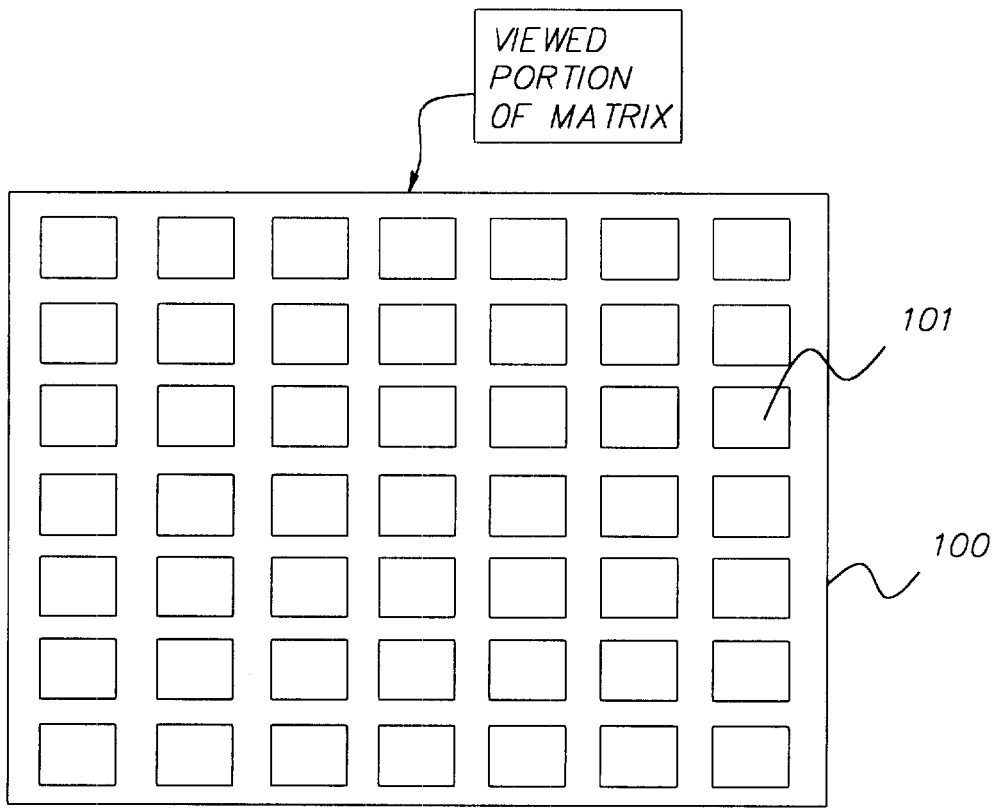
FIG. 3b is a block diagram of the matrix of images forming a quilt as envisioned by the present invention.
Figure 4:
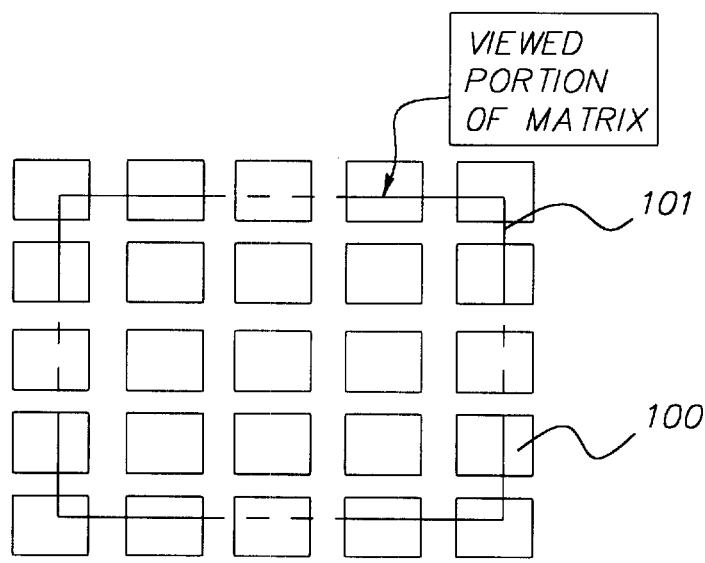

Alternative embodiments could include a border or spacing if desired between the individual images 101, such an embodiment is illustrated in FIG. 3b. A portion of the PhotoQuilt™ 20 is selected to be the viewed portion of the matrix 100. This viewed portion of the matrix 100 can then be zoomed in 100 as shown in FIG. 4. Specific search topics can be employed to retrieve images that relate to the topic searched, FIG. 5 illustrates the display of images 101 from such a search. This search is a text based string search using conventional text search algorithms. Text data searched is supplied with each image 101 before being placing on the PhotoQuilt™ 20. FIG. 6 illustrates the selection of individual images 101 to be viewed from the PhotoQuilt™ 20. First a user accesses the Matrix of Images 110, which in the preferred embodiment is the PhotoQuilt™ 20. The user then navigates around the matrix 112 using the tools previously described. Finally, a user selects an image for enlargement and to view associated text or identifying information 114.

Figure 7:
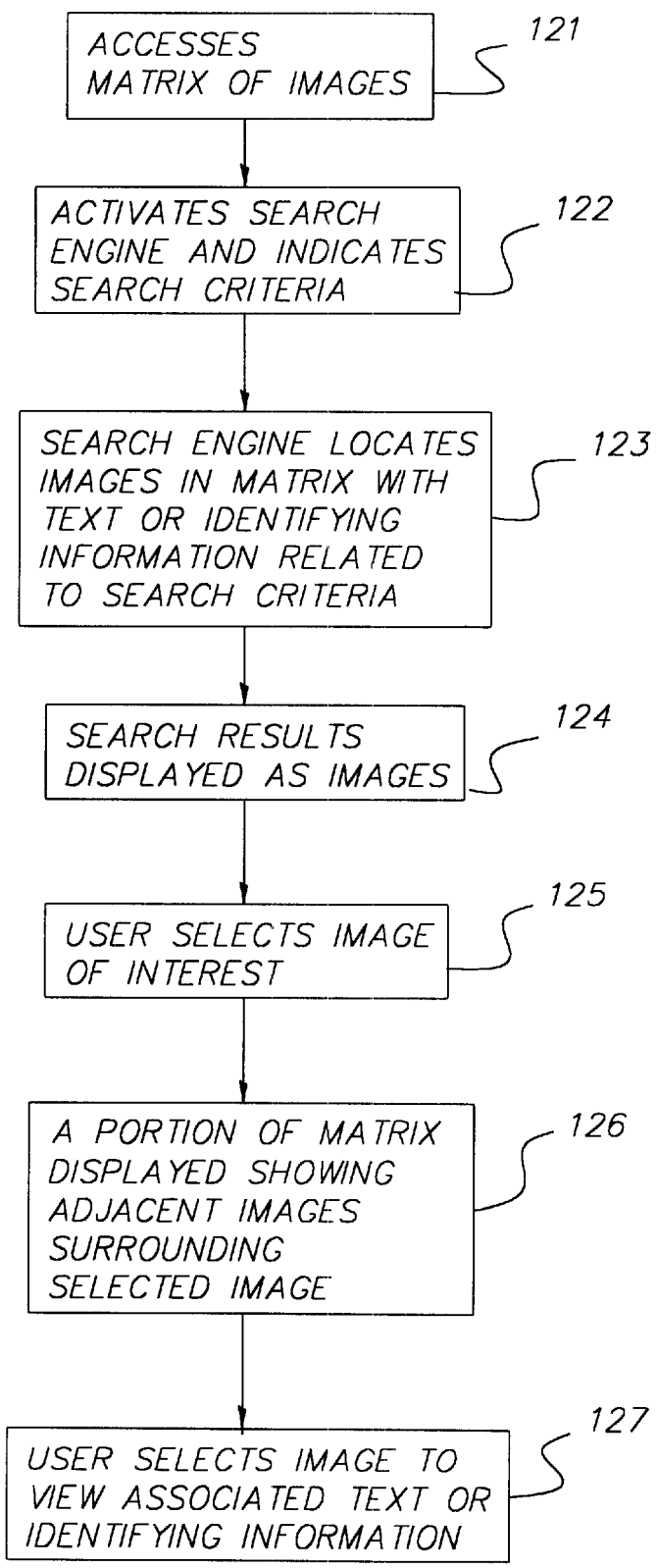
FIG. 7 is a block diagram illustrating the search of the matrix of images within the preferred embodiment.

FIG. 7 is a block diagram illustrating the searching of the matrix of images within the preferred embodiment. The user assesses the matrix of images 121 prior activating search engine and indicating the search criteria 122. The search engine located images in the matrix with text or identifying information related to search criteria 123. The search results are then displayed as images 124 and the user selects the image of interest 125. A portion of the matrix is displayed showing adjacent images surrounding the selected image 126. The user then selects the image to view with associated or identifying information 127.

The web site visitor uploads a digital image file, in a fashion like PictureThis or PhotoChat, where it conforms to a certain aspect ratio. Also, there is a form with check boxes and text fields where they can include how the picture was taken and comment why they submitted their picture and what the end of the millenium means to them. If the image is accepted (based on Kodak editorial guidelines), it will be added to a generated Flashpix image of the quilt.

A visitor to the web site can also to pan around the quilt image; zoom in on an area; select any particular image title and reveal that tile's input data—i.e., what the person who submitted the image had to say about it. They will also be able to search the quilt, in a similar fashion to a web search engine, for particular images based on key words or themes.

An optional attribute of this project is to build the quilt with imaging algorithms that match hues and values of submitted images and create a recognizable pattern in the overall quilt image. This pattern could be either a larger image or symbol, such as the K-logo shape or the composite similarity of the each image, for example.

As the "quilt" progresses and the upload option eventually concludes, various output options can be employed for displaying the quilt. These output options include displaying the "quilt" as an internet site of its own, or as any of a variety of display options. One of these output options relates to displaying the largest image ever made, such as museums, posters, magazine stories, billboards, public busses, or Kodarama in Times Square.

The file structure used to create the Kodak PhotoQuilt™ is that of a single large Flashpix image file. The Flashpix image architecture is comprised of several image "tiles" placed together horizontally and vertically. The tiles are 386 pixels wide and 256 pixels tall, however, it will be readily apparent to those skilled in the art that it is possible to build other quilts with different pixel dimensions per tile. Each of these tiles are placed side by side for a total dimension of 64 tiles wide and 64 tiles tall. It should also be readily apparent that the number of tiles horizontally and vertically are also configurable. The current PhotoQuilt™ is comprised of 4096 image tiles (64×64=4096). The PhotoQuilt™ started with 4096 totally black image tiles. The reason the PhotoQuilt™ appears to "grow" is that the user-submitted images are replacing the black images.

It is envisioned that viewing the quilt will be accomplished in a manner similar to the manner by which the Kodak® PhotoQuilt™ is viewed. The Kodak® PhotoQuilt is delivered through a standard Web browser, requiring no special plug-ins or proprietary software to view it. It is compatible with version 3.x and above for Netscape Communicator and MS Internet Explorer. When an internet visitor clicks to view the PhotoQuilt™, a request is made to the server, that provides that PhotoQuilt™, for the PhotoQuilt™ image. The software application on the server identifies which part of the image the visitor is requesting to see and dynamically generates a JPEG image that gets sent back to the visitor's browser. As the internet user zooms in or out, or pans left or right, the server sends back JPEG images that are dynamically derived from the larger Flashpix file. Thus, the internet user never needs to downloads the entire Flashpix file that comprises the PhotoQuilt™, but the internet user still experiences viewing and exploring the entire PhotoQuilt™ image.

For internet users using a 3.x browser version, the viewing page is refreshed with a new image referred to within the preferred embodiment as "viewstatic". For Internet users using a 4.x browser, the PhotoQuilt™ image is dynamically rendered in their browser, creating a seamless browsing experience. The reason for the two implementations is that 3.x browsers typically do not support dynamic HTML code containing JavaScript (DHTML). Version 4.x browsers and above are capable of viewing DHTML. It will be readily apparent to those skilled in the art that numerous variations of interfacing and displaying the quilt are possible.

A number of steps occur when an image is added to the PhotoQuilt™. A user submits a picture from either their computer, a URL, or a PhotoNet™ account. When the image is uploaded through the browser, the server takes appropriate measurements of the picture to ensure that it will physically fit into the PhotoQuilt™. If the image is not the appropriate size, the user may select to crop the picture to the correct size. Once the image is successfully uploaded, it is put into a director on the server, queued and waiting for review. It should be noted here that certain Web browsers may not support image upload capabilities, however the preferred embodiment envisions use of a Web browser that does.

An additional step of approving an image is performed. Any image submitted is reviewed and approval process takes place through a browser on a password-protected page. The images are displayed as thumbnails such that each can be viewed individually, along with their story. If a story is accepted, the image is added to an "approved" list. If a story is rejected, it is added to a "rejected" list. The approved images are now queued and ready to be added to the PhotoQuilt™. Approving pictures is currently a manual review process in the preferred embodiment of the PhotoQuilt™, but this manual reviewing process just a matter of clicking on links provided by the software on the server. A human "reviewer" assesses each image and its accompanying story for editorial appropriateness. The current PhotoQuilt 2000 editorial criteria is derived from corporate-developed guidelines.

The construction of the PhotoQuilt™ takes place anytime there are images on the approved list until the PhotoQuilt™ is complete. If so desired, the PhotoQuilt™ can be rebuilt. Building the PhotoQuilt™ is just a matter of clicking on the "Build" link on the password-protected administrative page. This action results in the server software getting the pending approved list of pictures and stories and rendering the pictures into the existing PhotoQuilt™ file, the newly added pictures replacing the default black image tiles. Once the rebuild is complete, which can take a few moments, the reviewer clicks on another link on the administrative page that executes a program that recompiles the index file of pictures in the PhotoQuilt™, adding the new submissions to the text database file. This allows the pictures to be found using the search function of PhotoQuilt™.

The PhotoQuilt™ Web Server Environment is a combination of both proprietary and commercial server software implementations. This includes server software that is provided via Unix®, Java®, Perl®, Netscape® and Kodak® Flashpix software.

The invention has been described in detail with particular reference to certain preferred embodiments thereof, but it will be understood that variations and modifications can be effected within the spirit and scope of the invention.

PARTS LIST

20 PhotoQuilt™
22 pan controls
24 matrix of images
26 navigation view
28 zoom controls
100 matrix
101 individual images
110 access matrix of images
114 selects an image for enlargement and to view associated text or identifying information
121 assesses the matrix of images
122 activating search engine and indicating the search criteria

What is claimed is:

1. A method of generating an image quilt from a plurality of
   individual images comprising the steps of:
   providing a computational element that is internet accessible and operatively connected to a storage device;

accepting uploads of a digital version of a plurality of images from a plurality of image sources from a plurality of users over the Internet;

modifying the images into a predetermined spatial format;

identifying a position within the quilt to place the images; and sequentially building the quilt with the images until a predetermined number of the images have been positioned within the quilt for completing a collaborative effort of the plurality of users from the Internet.

2. The method of claim 1 further comprising the step of verifying that the image complies with a predetermined criteria.

3. The method of claim 1 further comprising the step of converting the image from one digital format into another digital format.

4. The method of claim 1 further comprising the step of approving the images with predetermined criteria before placing the image within the quilt.

5. The method of claim 1 where in the step of acquiring further comprises a software application on the computational device identifying which portion of the quilt an internet user is requesting to see and dynamically generating a JPEG image that is sent back to the internet user's browser.

6. The method of claim 5 wherein the software application provides the internet user with the ability to zoom in, zoom out, or pans left or right across the quilt.

* * * * *